March 26, 1957
B. B. CULVER
2,786,711
DEVICE TO PREVENT WIND NOISE
AT VEHICLE SIDE VENT OPENING
Filed Jan. 26, 1955
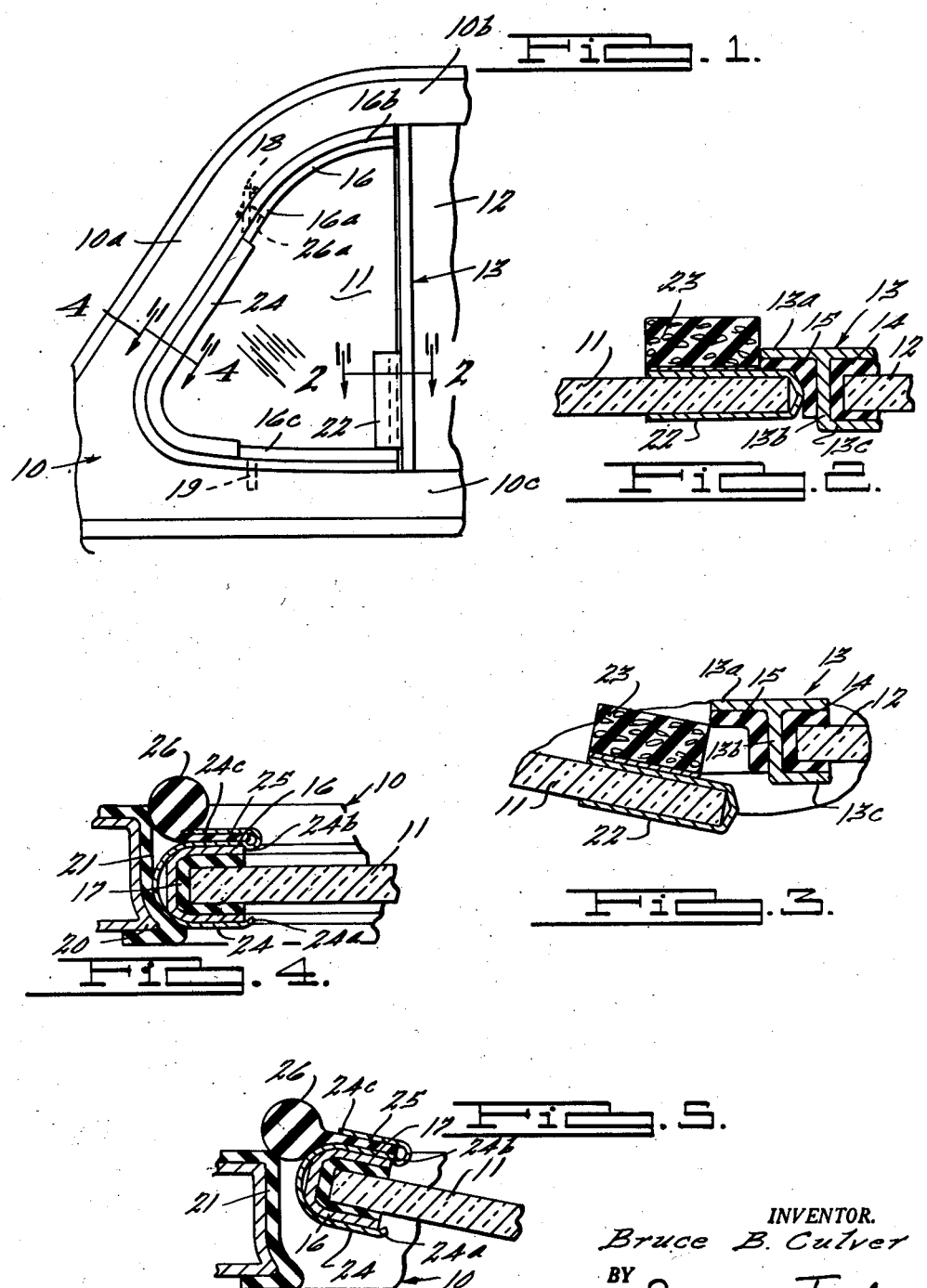
INVENTOR.
Bruce B. Culver
BY
Jay C. Taylor
ATTORNEY

United States Patent Office 2,786,711
Patented Mar. 26, 1957

2,786,711

DEVICE TO PREVENT WIND NOISE AT VEHICLE SIDE VENT OPENING

Bruce B. Culver, Howell, Mich.

Application January 26, 1955, Serial No. 484,256

10 Claims. (Cl. 296—44)

This invention relates to a vehicle body construction and in particular to means for minimizing wind noises which ordinarily originate around the customary automobile ventilating window or windwing when the latter is cracked partially open, as for example during cold weather to draw smoke from the interior of the automobile or to improve the operation of the automobile heater.

Frequently during cold weather when the automobile ventilating windows or windwings cannot be opened fully with comfort, the same are cracked slightly open for the reasons above. On such occasions, air rushing past the partially open windows causes an objectionable whistling or roaring noise which makes normal conversation within the automobile impossible. An important object of the present invention is to provide simple, improved, and readily installed means for eliminating or minimizing such noises.

I have found that the major source of such noise exists at the region of the lower one-third of the trailing edge of the ventilating window or windwing, and that a secondary source of such noise exists along the lower two-thirds of the leading edge of the ventilating window or windwing, the noise from the secondary source diminishes rearwardly along the bottom edge of the ventilating window toward the latter's conventional pivot mounting. It is accordingly another and more specific object to provide a sealing pad of compressible rubber-like material adapted to be detachably secured to the trailing edge of the ventilating window in position to close the lower one-third of the space between the latter and the adjacent automobile body frame when the ventilating window is cracked slightly open, and to provide a sealing strip of compressible rubber-like material adapted to be detachably secured to the leading edge of the ventilating window in position to close the lower two-thirds of the space between the latter and the adjacent body frame when the ventilating window is cracked slightly open.

Other objects of this invention will appear in the following description and appended claims, reference being had to the accompanying drawings forming a part of this specification wherein like reference characters designate corresponding parts in the several views.

Fig. 1 is a fragmentary side elevation of a vehicle body showing the exterior of the upper forward portion of the left front door and an embodiment of the present invention in application with the horizontally swinging ventilating window panel.

Fig. 2 is a fragmentary enlarged horizontal section taken in the direction of the arrows substantially along the line 2—2 of Fig. 1.

Fig. 3 is a view similar to Fig. 2, showing the ventilating window panel in a partially open position.

Fig. 4 is a fragmentary enlarged transverse section taken in the direction of the arrows substantially along the line 4—4 of Fig. 1.

Fig. 5 is a view similar to Fig. 4, showing the ventilating window panel in the partially open position.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring in more particularity to the drawings, a fragmentary exterior view of the front left door 10 of an automobile body is illustrated in Fig. 1. The door is provided with the customary horizontally swinging ventilating window panel 11 and a vertically sliding window panel 12. The window openings for the panels 11 and 12 are defined by frame portions of the door 10 comprising a rearwardly inclined forward portion 10a which merges into upper and lower rearwardly extending horizontal portions 10b and 10c. As illustration in Fig. 2, a pillar or mullion 13 between the panels 11 and 12 comprises an inner flange 13a parallel to the panel 12, a transverse intermediate flange 13b extending perpendicularly and inwardly from the flange 13a, and an outer flange 13c extending perpendicularly and rearwardly from the outer edge of the flange 13b to provide a rearwardly opening channel containing an edge of the vertically sliding panel 12. A channel formed padding 14 is cemented within the channel of the mullion 13 in contact with the adjacent edge of the panel 12 to protect the same and to prevent its rattling and vibration. Secured to the forward portion of the mullion 13 is a flexible strip 15 of L-section having an inner leg cemented to the flange 13a and a rear leg cemented to the flange 13b.

Extending along all but the rearward edge of the panel 11 is a channel edge-molding member 16 having forward, upper, and lower portions 16a, 16b and 16c substantially parallel to the corresponding juxtaposed frame portions 10a, 10b, and 10c, Fig. 1. A channel-formed padding 17, Fig. 4, confined within the channel molding member 16 is cemented thereto and to the adjacent edges of the panel 11 contained therein. Pivoting of the panel 11 is permitted by coaxial upper and lower pins 18 and 19, Fig. 1, secured to the molding portions 16a and 16c respectively and journaled above and below in the frame portions 10a and 10c at locations between the foremost and rearmost edges of the panel 11. Raised from the outer edge of the frame portion 10 in the region forward of the pivots 18 and 19 is a bead or stop 20, Fig. 4, which limits inward swinging of the panel 11 when the latter is in the closed position shown. Also extending around and secured to the frame portion 10 forwardly of the mullion 13 is a flexible strip 21 which is engaged by the adjacent portions of the panel 11 when the latter is closed.

In order to prevent whistling or wind noises when the panel 11 is cracked open slightly, as for example during cold weather when it is desired to withdraw smoke from the interior of the body without causing excessive ventilation, the approximate lower third of the rear edge of the panel 11 is confined within a vertical forwardly opening channel clip or resilient fastener 22, Fig. 3. The latter may be permanently secured to the panel 11 but is preferably removably retained by its channel walls resiliently clamping the panel 11 and frictionally engaging the same. Extending vertically the length of the clip 22 and cemented to the latter's inner channel wall is a resilient deformable sealing pad 23, Figs. 2 and 3, of rubber-like material, such as sponge neoprene, having its rearward edge snugly engaging the forward edge of the inner leg of weatherseal 15 when the panel 11 is closed. Thus when the panel 11 is opened slightly, as illustrated in Fig. 3, the sealing pad 23 closes the space between the rear of the panel 11 and the weatherseal 15 to prevent the rushing of air therebetween. I have found that a primary source of wind noise around automobile ventilating windows exists at the region of the lower third of the rearward edge of panel 11 when the latter is cracked slightly open. By locating the sealing pad 23 as shown, wind noise is substantially eliminated without interfering with normal ventilation at the approximate upper two-thirds of the panel 11 above the sealing pad 23.

A source of secondary and less objectionable wind noise exists along the forward edge of the panel 11 intermediate the pivots 18 and 19, Fig. 1. Accordingly a channel clip or resilient fastener 24, Fig. 4, is detachably fitted over the aforesaid forward edge of the panel 11, the outer and inner rearward portions of the clip 24 extending toward each other at 24a and 24b respectively so as to interlock with the molding 16. From the portion 24b, the clip curves inwardly and then forwardly at 24c to provide a forwardly opening retaining channel for the rearwardly directed tab 25 of a sealing strip 26. The tab 25 and sealing strip 26 comprise an elastic deformable material similar to the sealing pad 23 and extend longitudinally of the clip 24 throughout its length. When the panel 11 is in the closed position, Fig. 4, the sealing strip 26 is deformed against the adjacent inner portion of the seal 21, so that upon opening the panel 11 slightly to the position of Figs. 3 and 5, the sealing strip 26 remains in engagement with the strip 21 to prevent the rushing of air between the latter and itself.

I have found that when the sealing strip 26 is not employed, the wind noise along the forward edge of the panel 11 is most objectionable in the region of the upper pivot 18 and gradually diminishes along the lower forward edge of the panel 11 toward the pivot 19. Accordingly an upper end 26a of the strip 26 extends slightly above the pivot 18. Where desired, the lower extension of the clip 24 and sealing strip 26 can be feasibly terminated slightly above the lower forward apex or corner portion of the panel 11. In order to eliminate substantially all traces of wind noise, the clip 24 and sealing strip 26 are continued downwardly and rearwardly to the pivot 19 as shown. By virtue of the frictional engagement between the clip 22 and panel 11, and the resilient engagement between the clip 24 and panel 11, these clips can be readily removed in the summer and reinstalled in the winter.

I claim:

1. In a vehicle body construction having a window frame portion defining a window opening and also having a horizontally swinging window panel arranged to close said opening and to swing its forward edge inwardly and its rearward edge outwardly of said frame portion to an open position, means to close the space between the lower portion of said forward edge and the juxtaposed frame portion and to minimize wind noise at all positions of said panel between a partially open position and a completely closed position comprising a resiliently yieldable sealing strip secured to said forward edge and extending along said lower portion thereof, said strip being resiliently yieldable inwardly with respect to said forward edge upon closing said panel and engaging the inner side of the juxtaposed frame portion under tension at all of said positions, and the space above said strip between said forward edge and juxtaposed frame portion being open for passage of air.

2. In a vehicle body construction having a window frame portion defining a window opening and also having a horizontally swinging window panel arranged to close said opening and to swing its forward edge inwardly and its rearward edge outwardly of said frame portion to an open position, means to minimize wind noise when said panel is swung to a partially open position comprising a resiliently yieldable sealing pad secured to said rearward edge and closing the space between said rearward edge and the juxtaposed frame portion when said panel is in said partially open position, said sealing pad extending along the approximate lower one-third of said rearward edge, and the space above said pad between said rearward edge and juxtaposed frame portion being open for passage of air.

3. In a vehicle body construction having a window frame portion defining a window opening and also having a horizontally swinging window panel arranged to close said opening and to swing its forward edge inwardly and its rearward edge outwardly of said frame portion to an open position, means to minimize wind noise when said panel is swung to a partially open position comprising a resiliently yieldable sealing strip and pad secured to said forward and rearward edges respectively and closing the spaces between said forward and rearward edges and the juxtaposed frame portion when said panel is in said partially open position, said strip extending along the approximate lower two-thirds of said forward edge and said pad extending along the approximate lower one-third of said rearward edge, the space between said forward and rearward edges and juxtaposed frame portion above both said strip and pad being open for passage of air.

4. In a vehicle body construction having a window frame portion defining a window opening, a horizontally swinging window panel arranged to close said opening and pivoted adjacent its upper and lower edges to said frame portion at locations intermediate the forward and rearward edges of said panel to swing said forward edge inwardly and said rearward edge outwardly of said frame portion to an open position, means to minimize wind noise when said panel is swung to a partially open position comprising a resiliently yieldable sealing pad secured to the outer surface of said panel adjacent said rearward edge and snugly adjacent said frame portion when said panel is in closed position, said sealing pad extending along the approximate lower one-third of said rearward edge and yieldingly engaging the juxtaposed frame portions when said panel is partially open, thereby to close the space between said panel and frame portion throughout the extent of said pad, the space above said pad between said rearward edge and frame portion being open for passage of air when said panel is partially open.

5. The combination as set forth in claim 4 and comprising in addition a resiliently yieldable sealing strip secured to the inner surface of said panel adjacent said forward edge and having a forwardly extending portion resiliently engaging the juxtaposed frame portion when said panel is in either closed or partially open position, said sealing strip extending along the approximate lower two-thirds of said forward edge and the space above said strip between said forward edge and frame portion being open for passage of air.

6. In a vehicle body construction having a window frame portion defining a window opening, a horizontally swinging window panel arranged to close said opening and pivoted adjacent its upper and lower edges to said frame portion at locations intermediate the forward and rearward edges of said panel to swing said forward edge inwardly and said rearward edge outwardly of said frame portion to an open position, means to close the space between said forward edge and the juxtaposed frame portion approximately throughout the region between the pivots for said panel and to minimize wind noise at all positions of said panel between a partially open position and a completely closed position comprising a resiliently yieldable sealing strip secured to the inner surface of said panel adjacent said forward edge and having a forwardly extending portion resiliently yieldable inwardly with respect to said forward edge and adapted to engage the juxtaposed frame portion under tension when said panel is at all of said positions, said sealing strip extending along said forward edge from adjacent the upper pivot for said panel to adjacent the lower pivot for said panel and the space above said strip between said forward edge and frame portion being open for passage of air.

7. In a vehicle body construction having a window frame portion defining a window opening, a horizontally swinging window panel arranged to close said opening and pivoted adjacent its upper and lower edges to said frame portion at locations intermediate the forward and rearward edges of said panel to swing said forward edge inwardly and said rearward edge outwardly of said frame portion to an open position, means to minimize wind noise when said panel is swung to a partially open position comprising a channel clip removably secured to the lower portion of said rearward edge, said rearward edge being between the channel sides of said clip and clamped therebetween, and a resiliently yieldable sealing pad secured to the outer surface of said channel clip, said sealing pad extending along the approximate lower one-third of said rearward edge and yieldingly engaging the juxtaposed frame portions throughout the extent of said pad when said panel is partially open, thereby to close the space between said panel and frame portion when said panel is partially open, the space above said pad between said rearward edge and frame portion being open for passage of air when said panel is partially open.

8. In a vehicle body construction having a window frame portion defining a window opening, a horizontally swinging window panel arranged to close said opening and pivoted adjacent its upper and lower edges to said frame portion at locations intermediate the forward and rearward edges of said panel to swing said forward edge inwardly and said rearward edge outwardly of said frame portion to an open position, means to minimize wind noise when said panel is swung to a partially open position comprising a resiliently yieldable sealing pad interposed between said frame portion and panel adjacent said rearward edge when the latter is in closed position, said sealing pad extending along the approximate lower one-third of said rearward edge and yieldingly engaging the juxtaposed frame portions throughout the extent of said pad when said panel is partially open, thereby to close the space between said panel and frame portion, the space above said pad between said rearward edge and frame portion being open for passage of air when said panel is partially open.

9. The combination as set forth in claim 8 and comprising in addition a resiliently yieldable sealing strip interposed between said frame portion and panel adjacent said forward edge and having a forwardly extending portion resiliently engaging the juxtaposed frame portion when said panel is in either closed or partially open position, said sealing strip extending along the approximate lower two-thirds of said forward edge and the space above said strip between said forward edge and frame portion being open for passage of air.

10. In a vehicle body construction having a window frame portion defining a window opening and also having a horizontally swinging window panel arranged to close said opening and to swing its forward edge inwardly and its rearward edge outwardly of said frame portion to an open position, means to minimize wind noise when said panel is swung to a partially open position comprising a resiliently yieldable sealing pad secured to one of the members comprising said frame portion and panel adjacent said rearward edge and closing the space between said rearward edge and the juxtaposed frame portion when said panel is in said partially open position, said sealing pad extending along the lower portion of said rearward edge, and the space above said pad between said rearward edge and juxtaposed frame portion being open for passage of air.

References Cited in the file of this patent

UNITED STATES PATENTS

| 2,692,793 | Bertelsen | Oct. 26, 1954 |
| 2,702,416 | Bright | Feb. 22, 1955 |
| 2,714,034 | Schrum | July 26, 1955 |